US007338312B2

(12) United States Patent
Herth

(10) Patent No.: US 7,338,312 B2
(45) Date of Patent: Mar. 4, 2008

(54) UNIVERSAL CABLE AND WORK BOX CONNECTOR

(76) Inventor: Greg Herth, 10 Tower Mews, Oakdale, NY (US) 11769

( * ) Notice: Subject to any disclaimer, the term of this patent is extended or adjusted under 35 U.S.C. 154(b) by 348 days.

(21) Appl. No.: 10/987,616

(22) Filed: Nov. 12, 2004

(65) Prior Publication Data

US 2006/0105614 A1    May 18, 2006

(51) Int. Cl.
*H01R 13/58* (2006.01)

(52) U.S. Cl. ...................................... 439/461

(58) Field of Classification Search ............... 439/461, 439/544, 462, 552; 174/135, 65 R; 285/159, 285/161, 382, 342
See application file for complete search history.

(56) References Cited

U.S. PATENT DOCUMENTS

| 576,611 | A | * | 2/1897 | Post ............................. 16/2.4 |
| 3,322,890 | A | * | 5/1967 | Kennedy et al. ......... 174/152 R |
| 4,494,779 | A | | 1/1985 | Neff et al. ................... 285/159 |
| 4,790,505 | A | | 12/1988 | Rose et al. ................. 248/205 |
| 4,842,548 | A | | 6/1989 | Bolante ...................... 439/461 |
| 4,975,629 | A | | 12/1990 | Callahan et al. ............. 323/235 |
| 5,068,496 | A | | 11/1991 | Favalora ..................... 174/65 |
| 5,132,493 | A | | 7/1992 | Sheehan ...................... 174/65 |
| 5,248,850 | A | | 9/1993 | Laney ......................... 174/65 |
| 5,276,280 | A | | 1/1994 | Ball ........................... 174/65 |
| 5,285,013 | A | | 2/1994 | Schnell et al. ............... 174/65 |
| 6,043,432 | A | | 3/2000 | Gertz ......................... 174/65 |
| 6,066,807 | A | * | 5/2000 | Gudgeon ................... 174/135 |
| 6,736,715 | B2 | | 5/2004 | Kuhn ......................... 451/868 |
| 2004/0055774 | A1 | | 3/2004 | Vagedes .................... 174/58 |

* cited by examiner

*Primary Examiner*—Alexander Gilman
(74) *Attorney, Agent, or Firm*—Alfred M. Walker

(57) ABSTRACT

A cable connector is used with either a thin walled internally mounted electrical work box or a thicker-walled externally mounted electrical work box having threaded holes. The cable connector has a central plate between oppositely extending noses, including at least one of a snap-fit, rounded protruding nose and a nose having external threads which are engageable with threads in the access holes of external boxes, or a pair of opposite threaded front and rear sections. Optionally one or more annular grooves are adjacent to the central ridge. The cable connector is squeezed slightly to start the thread engagement from the outside of an external type electrical work box. It is then turned to engage and tighten in place.

9 Claims, 4 Drawing Sheets

UNIVERSAL CABLE AND WORK BOX CONNECTOR

FIELD OF THE INVENTION

The present invention relates to universal electrical cable and work box connectors, known in the trade as ROMEX® connectors.

BACKGROUND OF THE INVENTION

An invention of Gudgeon (U.S. Pat. No. 6,066,807) describes a connector with several advantages relative to its prior art. Besides the ability to install it from the outside of an electrical work box as is done with other connectors, this connector can also be installed from inside the electrical work box by first threading it over the non-metallic electrical cable wires that had already been installed through the work box. This capability greatly reduces the labor involved in doing retrofit work on an existing wall installation. It eliminates the need for removing wall covering, such as sheetrock, to expose the exterior surface of the electrical work box so that a conventional connector can be installed, locked in place, and the cable properly clamped. Obviously, the wall would have to be patched after such an operation.

The connector of Gudgeon '807 is generally cylindrical and has a central orifice. It has a bullet shaped tapered nose at each end with a groove toward the center on either side of a center ridge. The outside diameter of the largest end (toward the center) of each nose piece is larger than the hole in the electrical work box for which it is designed. Typically, the electrical work boxes have either ½ inch or ¾ inch diameter holes, and the connectors are designed for use in either one or the other size.

The connector of Gudgeon '807 has a wide longitudinal slot which permits the resilient housing to be squeezed so as to enter the electrical box hole of a thin-walled electrical work box mounted internally inside of a building structure. The resilient housing is squeezed to then snap in place at the groove adjacent the central ridge for retention. Also, this connector of Gudgeon '807 has an integral self-adjusting wire clamp in the form of an angled member inside the central orifice. Wires from the non-metallic cable can enter through the connector of Gudgeon '807 only in the relative direction from outside the electrical work box inward since they are clamped and resist pull out in the opposite direction (but wires already in the work box can be threaded through a connector which is installed in the electrical work box hole from the inside).

However, the connector of Gudgeon '807 cannot be used with external (i.e. surface mounted on the exterior of a structure) electrical work boxes which have thicker walls and threaded holes, typically on even thicker bosses. The internal electrical work boxes have thin walls which fit in the grooves of the connector of Gudgeon '807 for a snap-in installation.

OBJECTS OF THE INVENTION

It is therefore an object of the present invention to provide an electrical cable connector which can be used with either thin-walled internal electrical work boxes mounted in a building interior or thicker, threaded external work boxes mounted to the exterior of a building.

It is also an object of the present invention to provide a universal cable and work box connector having access thereto, thereby minimizing the need for wall sheetrock removal.

Other objects which become apparent from the following description of the present invention.

SUMMARY OF THE INVENTION

In keeping with these objects and others which may become apparent, the cable connector of this invention is used with a thin walled internally mounted electrical work box or a thicker-walled externally mounted electrical work box.

The cable connector of this invention has the features of the connector of Gudgeon '807, but it has been modified so that it can also be used with thicker-walled, external electrical work boxes having threaded holes. One of the snap-fit noses of the cable connector of Gudgeon '807 has been replaced with a nose having external threads, which are engageable with threads in the access holes of external work boxes.

The universal electrical cable and work box connector can be used with a thin-walled internal electrical work box for snap-in installation or for a thick-walled external electrical work box for threaded engagement. It includes a front nose section, a rear section having external threads with the rear section tapering inwardly toward a rear end of the electrical work box connector, and a central ridge section between the front and rear sections, with grooves separating the central ridge section from the aforementioned front and rear sections.

The cable connector has a central orifice containing an angled wire clamp member and a longitudinally extending slot extending the length thereof to allow the cable connector to be squeezed together for insertion of the front or rear section through an opening in an internal electrical work box.

The tapering of the threaded rear section prevents interference from its external threads during an outside-in snap-in installation. The external threads are adapted to engage threads in an opening of an external electrical work box having corresponding internal threads.

The longitudinally extending slot allows the cable connector to be squeezed slightly to start engagement of the corresponding external and internal threads.

During installation, the cable connector of this invention is squeezed slightly to start the thread engagement from the outside of an external type electrical work box. It is then turned to engage and tighten as with a conventional connector. To facilitate tightening or removal from an external work box, one or more optional flats are provided on the periphery of the central ridge to accommodate the use of a wrench. The cable connector of this invention can still be snapped-in from the outside of an internal type electrical work box in the same manner as the connector of Gudgeon '807, since the external threads on the internal nose do not interfere with this function. The cable connector of this invention is manufactured from a material selected from a group consisting of plastic, plastic composite, rubber, rubber composite, metal, and metal alloy.

In an alternate embodiment, the groove toward the front of the central ridge has been eliminated resulting in a slightly shorter connector. Whereas this embodiment cannot be snapped in from inside a box, it is useful for new construction on interior boxes and will screw into the threads on the side of an external box in the same manner as the previous embodiment. Using slightly less material and a more simple injection mold, this embodiment is less expensive to manufacture.

In a third embodiment of the connector of this invention, one feature is changed from that of the first embodiment. The bull nose front section is replaced by a screw thread identical to that of the rear section. The modified connector functions identically to that of the first embodiment with the capability to be snapped into electrical box holes from either inside or outside, and it can also be screwed into the side threads of an exterior type electrical box as in the first embodiment. In addition, the connector of this embodiment can also be used to join two external type boxes by screwing into side threads of both boxes. So, in addition to its use as an electrical connector, it can also substitute for a Chase nipple which is used solely for this purpose. The connector of this embodiment is therefore the most universal of the three embodiments.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
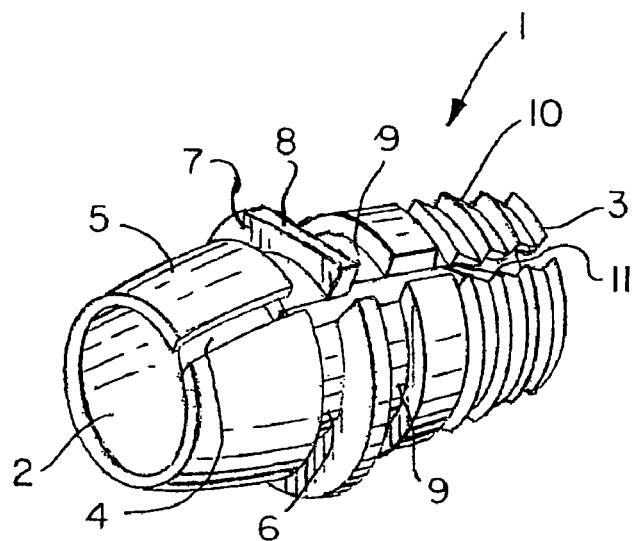
FIG. 1 is a perspective view of the cable connector of this invention, shown with an optional wrench flat.
Figure 2:
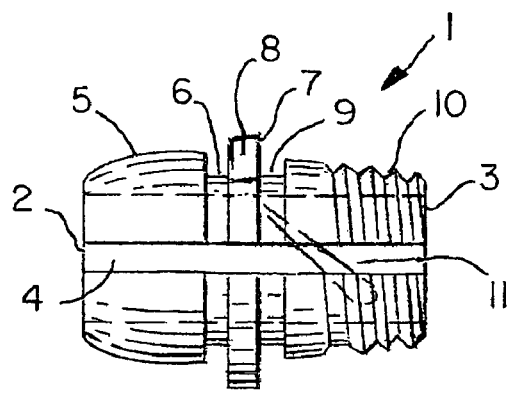
FIG. 2 is a side elevation of the cable connector as in FIG. 1.

The cable connector of this invention is shown in the two views of FIGS. 1 and 2. Cable connector 1 has outside end of central orifice 2 and interior end 3 with longitudinally extending slot 4. Front nose 5 is tapered toward end 2. Threaded nose 10 is also tapered. Central ridge 7 has optional wrench flat 8 and grooves 6 and 9 on either side. Angled wire clamp member 11 is shown within the central orifice.

Figure 3:
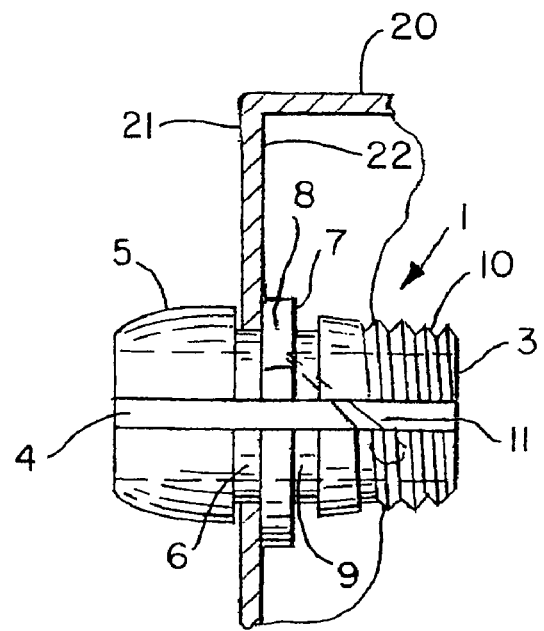
FIG. 3 is a side elevation view of the cable connector installed from inside-out on an internal electrical work box (wherein the box is shown in crossection)
Figure 4:
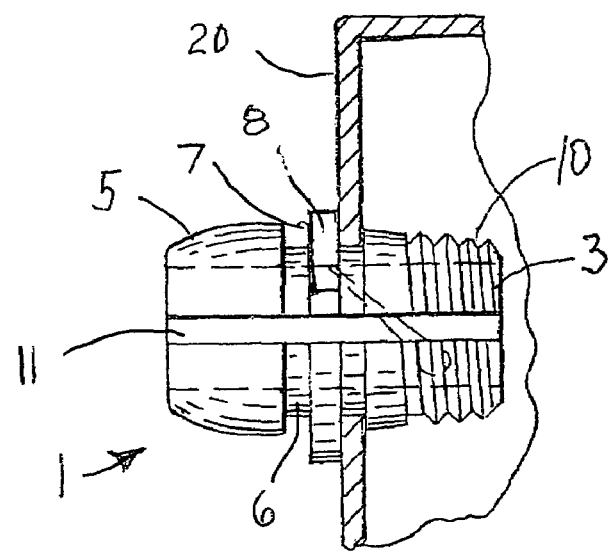
FIG. 4 is a side elevation view of the cable connector installed from outside-in on an internal electrical work box.

FIGS. 3 and 4 show installations of cable connector 1 in the sides of internal electrical work boxes in a manner that the original connector of Gudgeon '807 can be used.

Figure 5:
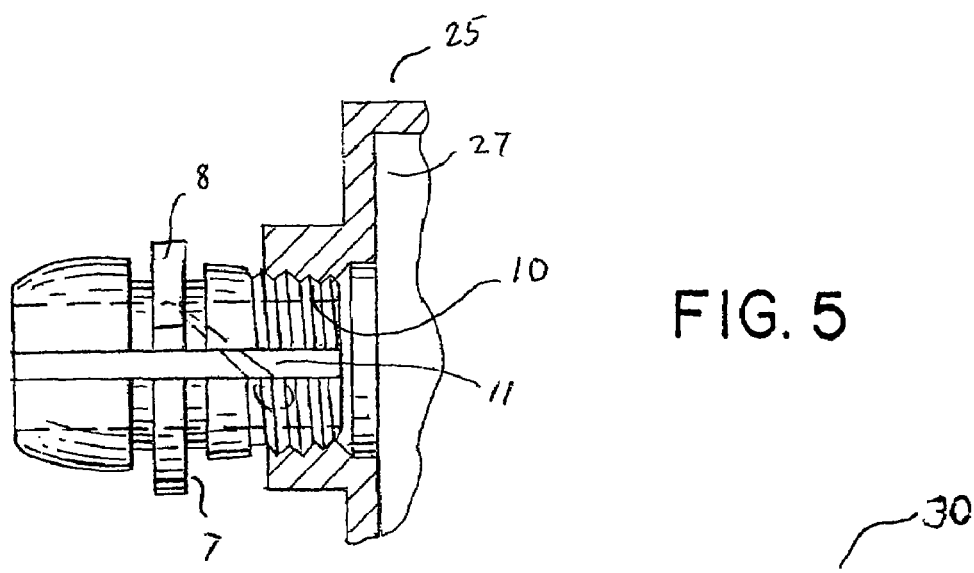
FIG. 5 is a side elevation view of the cable connector screwed into threaded opening of an external type electrical work box.

FIG. 5 shows the added capability of cable connector 1 installed on an external type electrical work box.

FIG. 3 shows an installation where connector 1 is pushed from the inside 22 of thin-walled internally mounted electrical work box 20 to the outside 21, wherein it snaps into the mounting hole at groove 6.

FIG. 4 shows cable connector 1 as pushed from the outside 21 of thin-walled internally mounted electrical work box 20 toward the inside 22 wherein it snaps into the mounting hole at groove 9. There is no interference from the external threads when cable connector 1 is installed in thin-walled internally mounted electrical work box 20.

FIG. 5 shows cable connector 1 installed by mating threads 10 with those of externally mounted type electrical work box 25 at threaded boss 28. This installation is from the exterior 26 of work box 25 toward the interior 27. When installed, threaded nose 10 is squeezed, thereby reducing the size of longitudinal slot 4, and therefore, the diameter of threaded nose 10, so threaded nose 10 can be inserted into the outer portion of threaded boss 28. When in place, threaded nose 10 is biased outwardly against the threaded orifice of boss 23 of thicker-walled externally mounted electrical work box 25.

Figure 6:
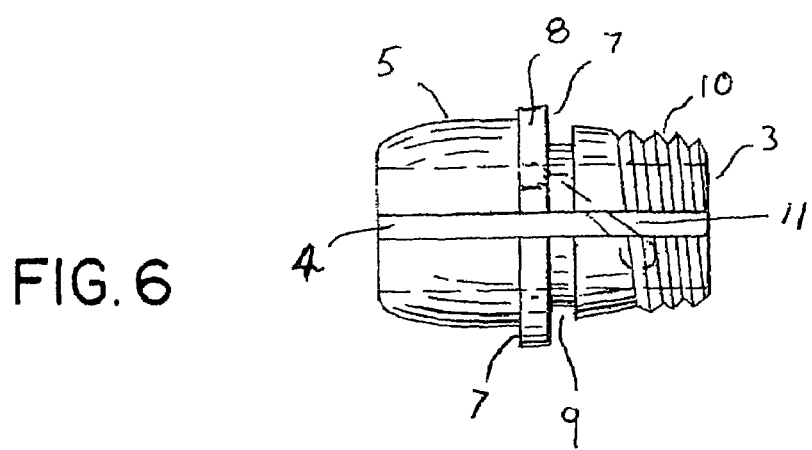
FIG. 6 is a side elevation of a connector of an alternate embodiment eliminating the front groove adjacent to the central ridge.
Figure 7:
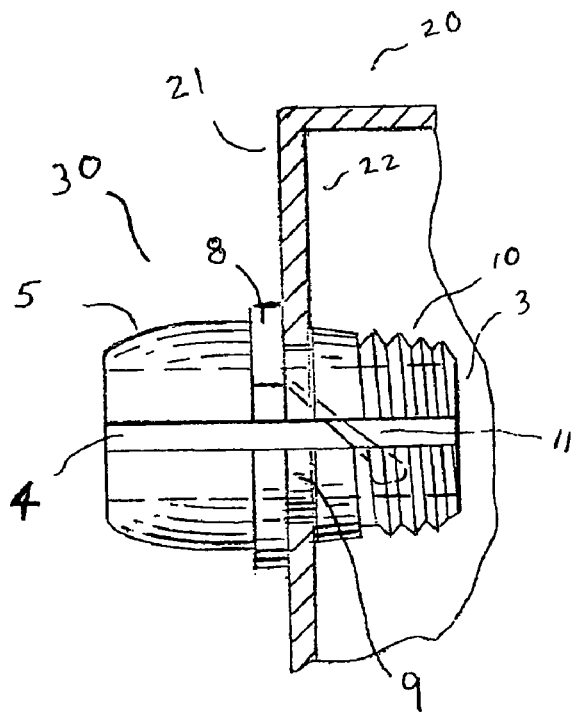
FIG. 7 is a side elevation view of the connector of FIG. 6 snapped into an electrical box from the outside surface.
Figure 8:
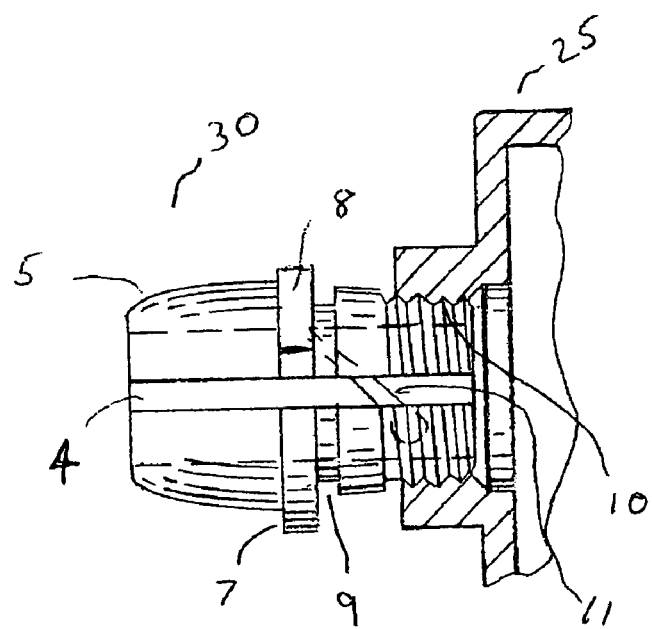
FIG. 8 is a side elevation view of the connector of FIG. 6 screwed into the side threads of an external box; and, FIG. 9 is a side elevation view of a third embodiment of the connector with threaded portions at either end.

FIGS. 6-8 illustrate an alternate embodiment connector 30 which eliminates the groove (groove 6 in the previous embodiment) toward the front of central ridge 7. Connector 30 can be snapped into the side holes of interior electrical boxes as for new construction; this is illustrated in FIG. 7. FIG. 8 shows connector 30 screwed into the side threads of external electrical box 25.

Figure 9:
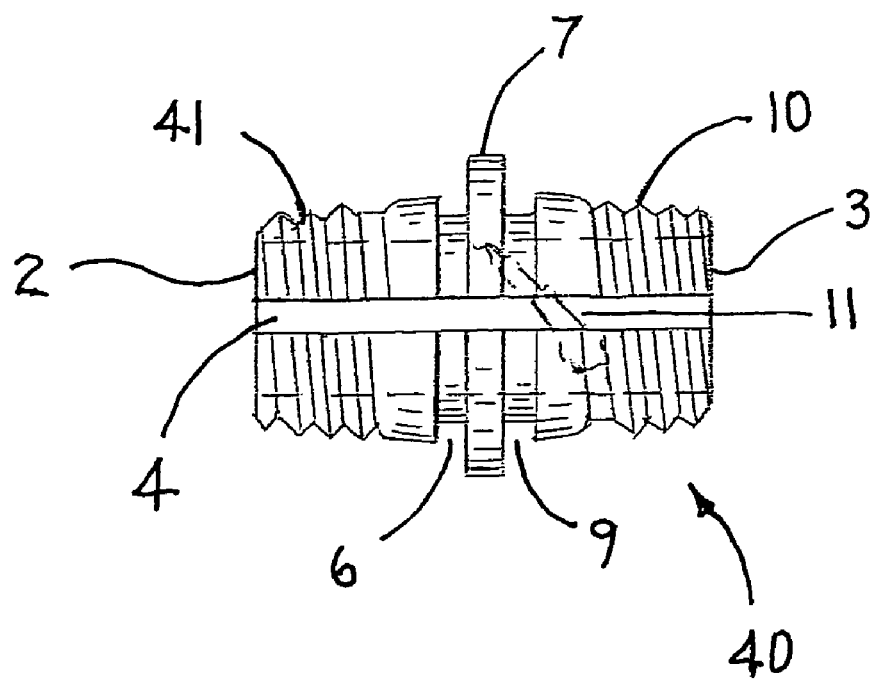

FIG. 9 shows a third embodiment of electrical connector which can be compared with the first embodiment depicted in FIGS. 1 and 2. The only feature changed is that the nose 5 of the first embodiment has been replaced with front threaded portion 41. With two grooves, 6 and 9, on either side of central ridge 7, it is obvious that this connector can perform identical functions to that of the first embodiment. The different shape of the external surface of the front portion does not preclude such use.

In addition, because of the two threaded ends, it can be used instead of a Chase nipple to join two external type electrical boxes by engaging threads on the sides of both boxes.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A universal electrical cable and work box connector in combination within electrical box comprising:

said electrical box having opening in a wall thereof:

said work box connector having a front nose section, a rear section having external threads with said rear section tapering inwardly toward a rear end of said work box connector, and a central ridge section between said front and rear sections with grooves separating said central ridge section from said front and rear sections;

an outer surface of said central ridge section having wrench engageable flat surfaces;

said work box connector having a central orifice defining an open space for insertion of wires therein, said open orifice containing an angled wire clamp member;

said work box connector having a slot extending the length thereof to allow said connector to be squeezed together for insertion of said front or rear section through said opening in said electrical work box, the tapering of said rear section preventing interference from said external threads during an outside-in snap-in installation; and said work box connector being mounted in said wall through said opening with said wall surrounding said opening being fitted into either of said grooves when said wall is thin, said work box connector being adapted to having said threaded rear section threaded into said opening when said wall is threaded, said slot allowing said work box connector to be squeezed slightly to start engagement of said external and internal threads, and said flat surfaces on the outer surface of said central ridge section allowing a wrench to be used to thread said threaded rear section into said opening.

2. The universal electrical cable and work box connector of claim 1 in which said front nose section tapers inwardly toward a front end of said work box connector to allow inside-out installation of said connector.

3. The universal electrical cable and work box connector of claim 2 in which said connector is made of a resilient material.

4. The universal electrical cable and work box connector of claim 3 in which said resilient material is selected from a group consisting of plastic, plastic composite, rubber, rubber composite, metal and metal alloy.

5. A universal electrical cable and work box connector in combination with an electrical box comprising:

said electrical box having a threaded opening in a wall thereof;

said work box connector having a front nose section tapering inwardly toward a front end of said work box connector; said work box connector having a rear section tapering inwardly toward a rear end of said work box connector, at least one of said sections being threaded;

said threaded section of said work box connector being threaded into said threaded opening in said electrical box thereby mounting said work box connector through said wall of said electrical box;

said work box connector having a central ridge section between said front and rear sections with at least one groove separating said central ridge section from said front and rear sections;

said work box connector having a central orifice defining an open space for insertion of wires therein, said open orifice containing an angled wire clamp member;

said work box connector having a slot extending the length thereof to allow said connector to be squeezed together for insertion of said front or rear section through said opening in said electrical work box, the tapering of said front and rear sections preventing interference from said external threads during installation of said connector, and said slot allowing said work box connector to be squeezed slightly to start engagement of said threads; and said work box connector being adapted for a snap-in installation through said opening with said wall surrounding said opening being fitted into said groove when said wall is too thin for threads.

6. The universal electrical cable and work box connector of claim 5 which both said front and rear sections are threaded and said connector joins two external electrical boxes together.

7. The universal electrical cable and work box connector of claim 5 in which said front section tapers inwardly toward a front end of said work box connector to allow inside-out installation of said connector.

8. The universal electrical cable and work box connector of claim 7 in which said connector is made of a resilient material.

9. The universal electrical cable and work box connector of claim 8 in which said resilient material is selected from a group consisting of plastic, plastic composite, rubber, rubber composite, metal and metal alloy.

* * * * *